(12) United States Patent
Mededovic et al.

(10) Patent No.: US 10,357,753 B2
(45) Date of Patent: Jul. 23, 2019

(54) ENHANCED CONTACT ELECTRICAL DISCHARGE PLASMA REACTOR FOR LIQUID AND GAS PROCESSING

(71) Applicants: Selma Mededovic, Potsdam, NY (US); Gunnar Stratton, Potsdam, NY (US); Thomas Holsen, Potsdam, NY (US); Christopher Bellona, Golden, CO (US)

(72) Inventors: Selma Mededovic, Potsdam, NY (US); Gunnar Stratton, Potsdam, NY (US); Thomas Holsen, Potsdam, NY (US); Christopher Bellona, Golden, CO (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 15/018,780

(22) Filed: Feb. 8, 2016

(65) Prior Publication Data
US 2016/0228844 A1     Aug. 11, 2016

Related U.S. Application Data

(60) Provisional application No. 62/113,097, filed on Feb. 6, 2015.

(51) Int. Cl.
*B01J 19/08*      (2006.01)
*C02F 1/46*       (2006.01)
*H05H 1/24*       (2006.01)

(52) U.S. Cl.
CPC .......... *B01J 19/088* (2013.01); *C02F 1/4608* (2013.01); *B01J 2219/083* (2013.01);
(Continued)

(58) Field of Classification Search
None
See application file for complete search history.

(56) References Cited

U.S. PATENT DOCUMENTS 4,085,170 A  *  4/1978  Simpson ............... B01D 11/02
                                                261/1
2002/0008014 A1 *  1/2002  Adachi ..................... A61L 2/03
                                                204/164

(Continued)

FOREIGN PATENT DOCUMENTS

GB            653697          5/1951
WO         2015/058122        4/2015

OTHER PUBLICATIONS

International Partial Search Report Form PCT/ISA/206, International Application No. PCT/US2016/046013, pp. 1-7, dated Apr. 13, 2017.

*Primary Examiner* — Kishor Mayekar
(74) *Attorney, Agent, or Firm* — Bond Schoeneck & King, PLLC; George McGuire (57) ABSTRACT

An electrical discharge plasma reactor system for treating a liquid, a gas, and/or a suspension. The reactor system includes a reactor chamber configured to hold the liquid and a gas, a discharge electrode disposed within the gas of the reactor chamber, a non-discharge electrode disposed within the liquid, a gas diffuser disposed within the liquid and configured to induce the generation of a layer of foam on the surface of the liquid in a plasma-contact region, and a power supply connected to the discharge electrode and configured to induce the discharge electrode to generate plasma in the plasma-contact region.

8 Claims, 9 Drawing Sheets

(52) U.S. Cl.
CPC *B01J 2219/0809* (2013.01); *B01J 2219/0815* (2013.01); *B01J 2219/0828* (2013.01); *B01J 2219/0832* (2013.01); *B01J 2219/0839* (2013.01); *B01J 2219/0841* (2013.01); *B01J 2219/0869* (2013.01); *B01J 2219/0871* (2013.01); *B01J 2219/0875* (2013.01); *B01J 2219/0877* (2013.01); *B01J 2219/0884* (2013.01); *B01J 2219/0894* (2013.01); *H05H 2001/2412* (2013.01); *H05H 2245/121* (2013.01)

(56) References Cited

U.S. PATENT DOCUMENTS

| | | | |
|---|---|---|---|
| 2003/0049183 A1* | 3/2003 | Sharma | A62D 3/19 422/186.07 |
| 2005/0189278 A1 | 9/2005 | Iijima et al. | |

* cited by examiner

ENHANCED CONTACT ELECTRICAL DISCHARGE PLASMA REACTOR FOR LIQUID AND GAS PROCESSING

CROSS-REFERENCE TO RELATED APPLICATIONS

This application claims priority to U.S. Provisional Patent Application Ser. No. 62/113,097, filed on Feb. 6, 2015, the entire disclosure of which is incorporated herein by reference.

GOVERNMENT FUNDING

This invention was made with Government support under the United States Environmental Protection Agency Award 83533201. The United States Government has certain rights in the invention.

FIELD OF THE INVENTION

The present disclosure is directed generally to methods and systems for treating gas and liquid, and more specifically to treating gas and liquid using advanced oxidation and reduction processes.

BACKGROUND

Removal of dissolved organic compounds from gas and liquids, including drinking water, groundwater, and wastewater among many other types of gas and liquids, is required for the health and safety of the public and the environment and is therefore a standard step in water treatment processes.

Conventional methods for removing organic compounds from gas and liquids involve either physical operations with high energy requirements, or addition of chemical oxidants that may yield undesirable halogenated organic byproducts. Advanced oxidation processes (AOPs) such as ultraviolet/hydrogen peroxide (UV/$H_2O_2$), photocatalysis, and sonication use the highly oxidative hydroxyl (OH) radical to degrade chemical contaminants in water and inactivate microorganisms without producing potentially hazardous halogenated species. However, high energy requirements and/or costly chemical additives limit the feasibility of these technologies.

Gas-phase electrical discharge plasma generated upon the surface of water has been shown to degrade dissolved organic compounds and inactivate microorganisms with high energy efficiency and no chemical additives. Similar to other AOPs, the effect of electrical discharge plasma is through the production of OH radicals. However, unlike many AOPs, the OH radicals are produced directly from the water, rather than through reactions with chemical additives (i.e. $H_2O_2$ or ozone). While much research has been done to advance the field of plasma-based water treatment, the lack of effective and scalable reactors has held back the widespread use of the technology.

Accordingly, there is a need in the art for more effective and affordable methods and systems for removing organic compounds from gas and liquids using electrical discharge plasma.

SUMMARY OF THE INVENTION

The present disclosure is directed to inventive methods and apparatus for treatment of a gas, liquid, and/or suspension using an enhanced contact electrical discharge plasma. Various embodiments and implementations herein are directed to an apparatus and method in which voltage is applied to an electrode to generate electrical discharge plasma upon the surface of a liquid, where a layer of foam is generated.

According to an aspect is an electrical discharge plasma reactor system for treating a gas or liquid. The reactor system includes: (i) a reactor chamber configured to hold the liquid and a gas; (ii) a discharge electrode disposed within the gas; (iii) a non-discharge electrode disposed within the liquid; (iv) a gas diffuser disposed within the liquid and configured to induce the generation of a layer of foam on the surface of the liquid in a plasma-contact region; and (v) a power supply connected to the discharge electrode and configured to induce the discharge electrode to generate plasma in the plasma-contact region.

According to an embodiment, the non-discharge electrode is a ring.

According to an embodiment, the non-discharge electrode comprises two or more rails disposed in the reactor chamber.

According to an embodiment, one of the non-discharge electrode rails is positioned on either side of the gas diffuser.

According to an embodiment, the reactor system further includes a suspended weir configured to alter a circulation pattern of the liquid within the reactor chamber.

According to an embodiment, the gas comprises argon.

According to an embodiment, the system further comprises a gas recycler configured to capture and reuse a gas pumped through the gas diffuser.

According to an aspect is an electrical discharge plasma reactor system for treating a gas or liquid. The reactor system includes: (i) a reactor chamber configured to hold the liquid and a gas; (ii) a discharge electrode disposed within the gas; (iii) a non-discharge electrode disposed within the liquid; (iv) a liquid jet disposed within the reactor chamber and configured to induce the generation of a layer of foam on the surface of the liquid in a plasma-contact region; and (v) a power supply connected to the discharge electrode and configured to induce the discharge electrode to generate plasma in the plasma-contact region.

According to an aspect is an electrical discharge plasma reactor system for treating a gas or liquid. The reactor system includes: (i) a reactor chamber configured to hold the liquid and a gas; (ii) a discharge electrode disposed within the gas; (iii) a non-discharge electrode disposed within the liquid; (iv) a suspended weir configured to alter a circulation pattern of the liquid within the reactor chamber; and (v) a power supply connected to the discharge electrode and configured to induce the discharge electrode to generate plasma in the plasma-contact region.

According to an embodiment, the reactor system includes a gas diffuser disposed within the liquid and configured to induce generation of a foam.

According to an embodiment, the reactor system comprises a liquid jet configured to induce generation of a foam.

According to an aspect is a method for treating a gas or a liquid. The method includes the step of providing an electrical discharge plasma reactor system, the system including: (i) a reactor chamber configured to hold the liquid and a gas; (ii) a discharge electrode disposed within the gas; (iii) a non-discharge electrode disposed within the liquid; (iv) a foam generator configured to induce the generation of a layer of foam on the surface of the liquid in a plasma-contact region; and (v) a power supply connected to the discharge electrode and configured to induce the discharge electrode to generate plasma in the plasma-contact region.

According to an embodiment, an organic material within the liquid or gas is dissolved.

According to an embodiment, an inorganic material within the liquid or gas is dissolved.

According to an embodiment, the foam generator is a gas diffuser.

According to an embodiment, the foam generator is a liquid jet.

These and other aspects of the invention will be apparent from the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

The present disclosure describes methods and systems for treating gas or liquids such as drinking water, groundwater, and wastewater, among many other gases and liquids. The systems discloses or otherwise envisioned herein can also be utilized to treat a suspension, for example. Enhanced contact electrical discharge plasma reactor is utilized, for example, to degrade organic compounds present in a liquid or gas. For example, voltage is applied to an electrode to generate electrical discharge plasma upon the surface of a liquid, where a layer of foam is generated in a plasma-contact region. According to an embodiment, the system can be operated at low liquid temperatures such as the range between refrigeration to the boiling point of the liquid. Additionally, compared to pasteurization and other sterilization and advanced processing techniques, the process described herein requires significantly less energy, thereby resulting in significant cost and efficiency savings.

For purposes of this disclosure, "treating" a liquid or gas can mean a wide variety of, for example, physical and/or chemical changes to the liquid and/or gas itself, or to a compound or compounds found within the liquid and/or gas. For example, compounds in the liquid or gas can be dissolved, processed, or otherwise affected by the plasma.

For purposes of this disclosure, a "foam" can mean a wide variety of physical configurations. A foam may simply be, for example, a plurality of bubbles of gas on the surface of a liquid. A foam may or may not comprise a surfactant or other foaming agent.

According to an embodiment, the process is capable of degrading dissolved organic compounds in a liquid or gas, including but not limited to pharmaceuticals, personal care products, endocrine disrupting compounds, agricultural pesticides and herbicides, and/or organic dyes, among many others. Advantageously, the process does not produce halogenated organic compounds, and does not require chemical additives. The system is also less sensitive than other systems to the electrical conductivity of the water being treated, and no erosion of the electrode occurs. Further, the system is highly modular, and treatment capacity can be increased. Using argon and oxygen, further, yields ozone which enhances the efficiency of the degradation and sterilization.

Figure 1:
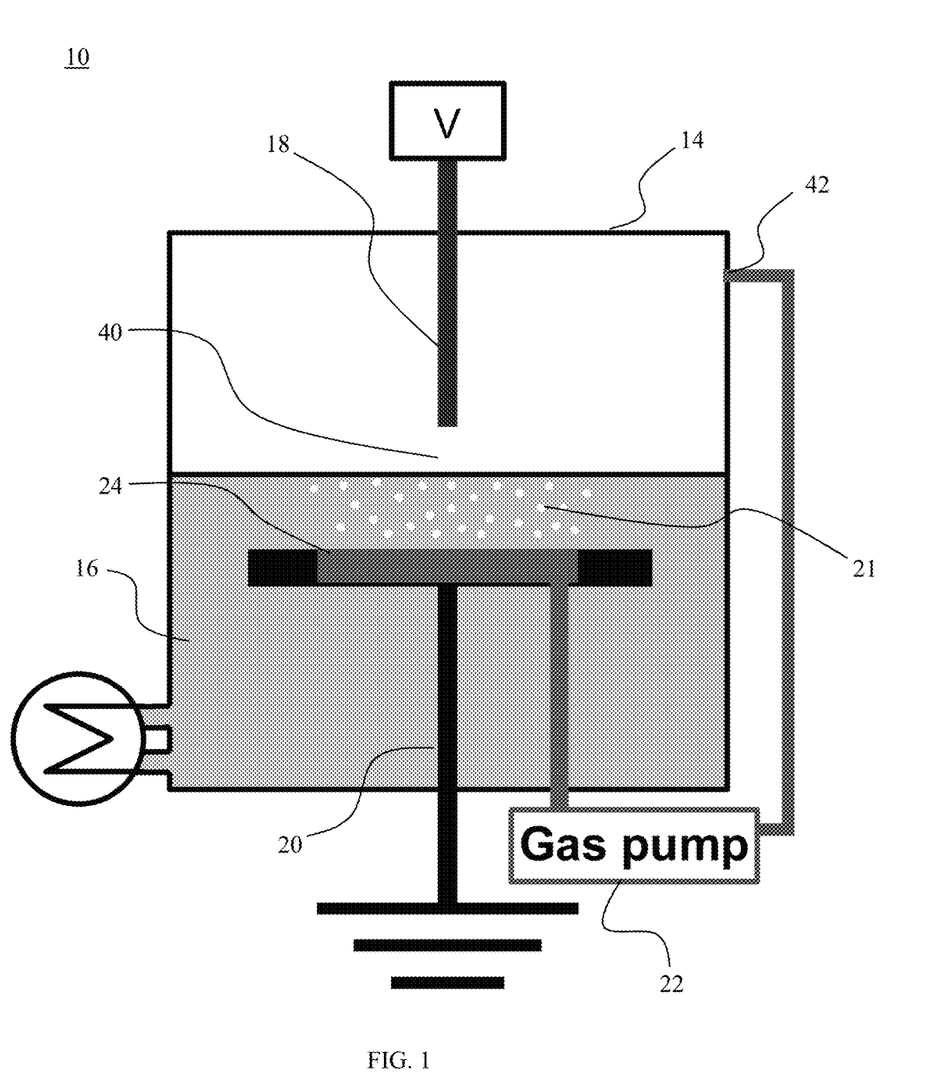
FIG. 1 is a schematic representation of a system for treatment of a gas or liquid in accordance with an embodiment.

Referring now to the drawings, wherein like reference numerals refer to like parts throughout, there is seen in FIG. 1, in one embodiment, an electrical discharge plasma reactor configuration for organic compounds degradation or microbial inactivation. According to an embodiment, the electrical discharge plasma reactor 10 includes a chamber 14. Chamber 14 can be very small or very large, as long as there is sufficient voltage, and thus sufficient plasma, to treat the liquid or gas within the chamber. Chamber 14 can include liquid 16 to be treated. The liquid can be any liquid for which treatment is desired, including but not limited to drinking water, groundwater, wastewater, or any of a wide variety of liquids. The liquid can be, for example, any liquid containing water, milk, juice, or any other consumable liquid, and could be a liquid or semi-liquid food, among many other possibilities.

Chamber 14 also comprises a first electrode 18 and a second electrode 20, where electrode 18 is the discharge electrode. The discharge electrode 18 is positioned above the surface of the liquid and thus within the gas of chamber 14, while the non-discharge electrode 20 can be placed in the liquid and/or in the gas of chamber 14. The configuration of electrodes in the reactor in FIG. 1 can be, for example, needle-to-needle, point-to-point, point-to-plate, and a wide variety of other configurations where one of electrodes 18 and 20 is the anode and the other is the cathode. According to an embodiment, the electrodes can be composed in part or entirely of metal or metal alloy such as silver, stainless steel, and carbon, among others, and can be a plate, tube, wire, and/or many other configurations. According to another embodiment, the electrodes can be composed of reticulated vitreous carbon, and or a metal tube. During operation of the reactor, a power supply can supply voltages ranging from approximately 100 to 100,000 V DC, pulsed DC, or AC of any frequency, for example, although other voltages are possible.

According to another embodiment, the system employs rings (such as for circular geometry) or parallel rails or bars (such as for rectangular geometry) as grounded electrodes to increase plasma contact area by coaxing the streamers further over the liquid surface. For example, the grounded electrode or electrodes can be parallel rails that are positioned on either side of gas diffusers such as that depicted in FIG. 1. Among other benefits, the rails provide some degree of control over the shape and breadth of the plasma streamers because their position alters the electric field geometry to attract the plasma streamers to propagate farther out over the liquid surface. Because these streamers are farther reaching, a broader region of the liquid surface is exposed to the plasma, which increases treatment rate. Another benefit of grounded rails is a reduction in the discharge current and a corresponding conservation of charge in the capacitor, which reduces the minimum capacitance, and thus input energy, needed to produce the plasma discharge in comparison to the case with a solid grounded electrode. This reduction of the input energy also increases treatment efficiency. The charge conservation effect also reduces the sensitivity of the process to the electrical conductivity of the liquid being treated, which makes the process more versatile than in the case of a solid grounded electrode.

Further, although the reactors depicted in the drawings are shown with only two or three electrodes, they can additionally or optionally comprise multiple electrodes. For example, there can be a mesh electrode, an electrode with multiple points or needles, and a variety of other types of electrodes to optimize the flow of energy and to direct the optimized creation of plasma.

Additionally, each electrical discharge plasma reactor 10 can include a liquid inlet and a liquid outlet, which may optionally be the same component. Each electrical discharge plasma reactor 10 also includes a power supply to supply voltages ranging from approximately 100 to 100,000 V DC, pulsed DC, or AC of any frequency, for example, to the discharge electrode 18.

Figure 2:
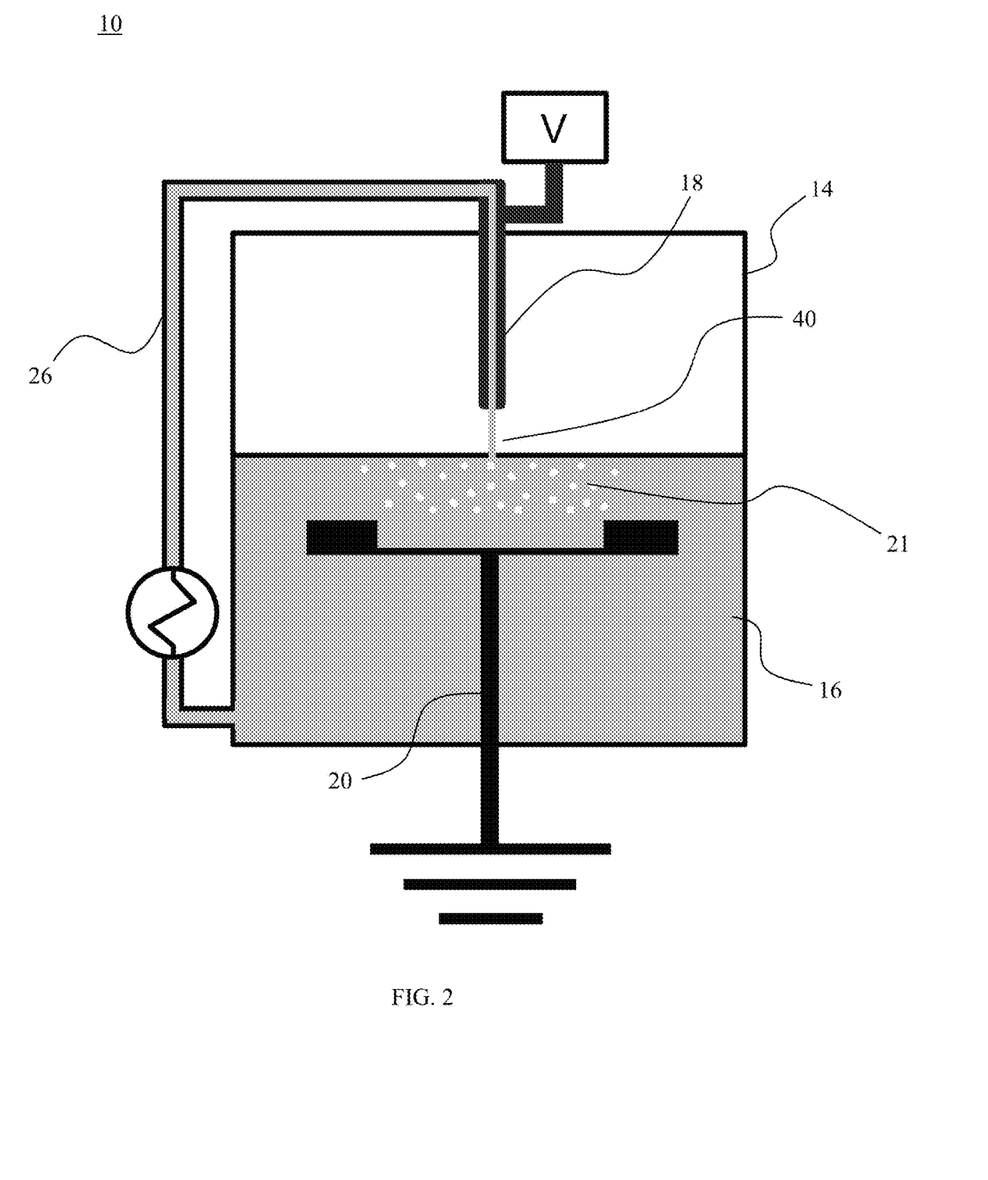
FIG. 2 is a schematic representation of a system for treatment of a gas or liquid in accordance with an embodiment.

According to some embodiments, electrical discharge plasma reactor 10 includes a gas pump 22. For example, a gas pump can pump a gas to create foam 21 within the chamber 14 at a plasma-contact region, indicated broadly by numeral 40. To create foam 21, the reactor can include a gas diffuser 24 that bubbles gas beneath the liquid surface, as shown in FIG. 1. According to an embodiment, gas can be bubbled through a diffuser and the grounded electrode can consist of a metal ring that surrounds the diffuser, among other embodiments. As yet another embodiment, the gas pump can include a high velocity liquid jet in the gas phase to churn the bulk liquid, as shown in FIG. 2. The liquid jet can be a single column or multiple columns, and can be any spray angle, among various other embodiments.

According to an embodiment, the submerged gas diffuser or diffusers 24 produce bubbles which results in the formation of a layer of foam on the liquid surface. This layer of foam increases the surface density of the liquid in the plasma-contacted region, which enhances the contact between the liquid and the plasma. Since treatment rate is directly proportional to the plasma-liquid contact area, this foam is highly beneficial for the process. Additionally, when surfactants are present in the liquid, they will tend to adsorb to and concentrate at the gas-liquid interface. As a result, when bubbles are formed within and then rise up through the liquid, the bubbles' interfaces will become increasingly saturated with surfactants, which results in higher concentrations of the surfactant within the plasma-contacted region. This increased interfacial concentration is beneficial because, as with plasma-liquid contact area, the treatment rate is directly proportional to the interfacial concentration of the target species.

According to an embodiment, the gas pump 22 of the electrical discharge plasma reactor 10, and/or a separate gas pump, is utilized to pump a gas into the chamber 14. According to an embodiment, a large volume of gas can be continuously pumped through the diffusers causing foam to be generated at a healthy rate. Electrical discharge plasmas in humid air can lead to the production of nitrates and nitrites, which can then accumulate in the water. Because federal agencies enforce quality standards regarding the maximum concentrations of nitrate and nitrite in drinking water, a neutral gas such as argon—among many other types of gases—can be used when treating drinking water. In this case, the plasma causes very little change in the composition of the argon; therefore, the argon may be recycled to minimize operating costs. When treating wastewater, air may be used instead of argon, because wastewater need not satisfy quality standards regarding nitrate and nitrite concentrations. According to an embodiment, the foam 21 can be generated using the same argon, air, or other gas pumped into the gas portion of chamber 14. If oxygen or air serve as process gases, their composition will not be entirely preserved in the presence of plasma, however, they can likely still be recycled to a substantial degree, and in doing so, allows for the utilization of any ozone that is produced by the plasma, which can further benefit the process through increased treatment rate.

Accordingly, system 10 and/or 100 may comprise a gas recycler to cycle a gas through the reaction chamber, via the gas diffuser and/or via a gas inlet and outlet. The gas recycler then obtains the gas from the reaction chamber and stores or immediately cycles that reclaimed gas into the reaction chamber via the gas diffuser and/or via a gas inlet. FIG. 1, for example, shows a gas pump 22 with the gas diffuser 24 as the gas inlet and a gas outlet 42.

FIG. 2 also shows liquid recirculation in the system, collecting from the bulk liquid in the reactor chamber and pumped back through the nozzle to yield the jet, according to an embodiment. Alternatively, the liquid may also be pumped in from outside the reactor.

Figure 3:
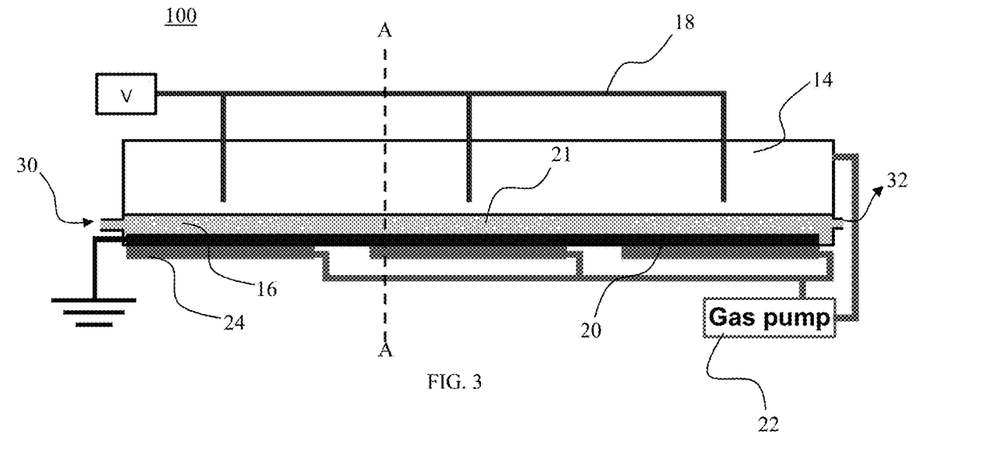
FIG. 3 is a schematic representation of a system for treatment of a gas or liquid in accordance with an embodiment.
Figure 4:
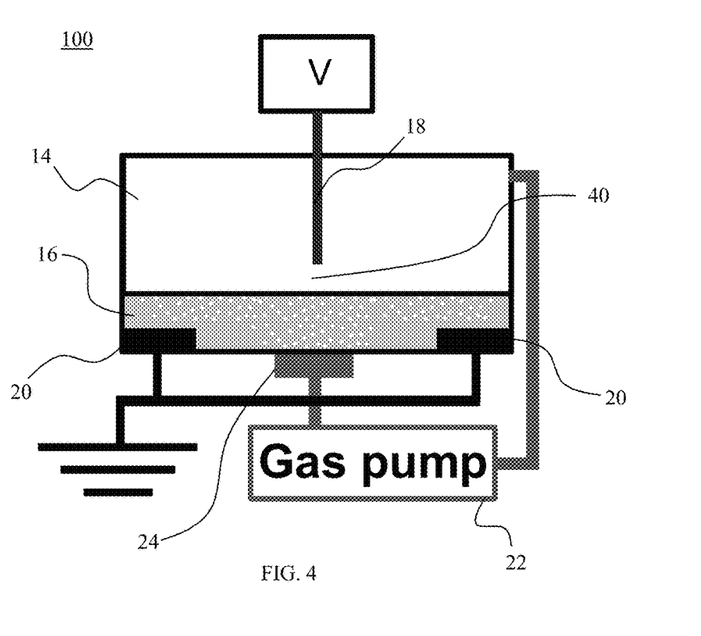
FIG. 4 is a schematic representation of the system depicted in FIG. 3, in accordance with an embodiment.

Referring to FIG. 3, in one embodiment, is a flow-through electrical discharge plasma reactor configuration 100. According to an embodiment, the flow-through electrical discharge plasma reactor 100 includes a chamber 14. The flow-through reactor includes gas pump 22. To create foam 21 at one or more locations along the flow-through chamber, the gas pump 22 can include one or more gas diffusers 24 that bubble gas beneath the liquid surface, as shown in FIG. 3, or the reactor can include a high velocity liquid jet in the gas phase to churn the bulk liquid. The gas diffuser 24 can be, for example, ceramic diffuser bars running the entire length of the reactor, among many other configurations. According to an embodiment, the grounded electrode consists of two metal bars running in parallel on either side of the diffuser although other configurations are possible. The discharge electrode can be, for example, one or more electrodes as shown in FIG. 3, or any of the other embodiments described or otherwise envisioned herein. According to an embodiment, liquid enters the flow-through reactor at inlet 30, flows through the reactor, and exits the reactor at outlet 32, although the reactor can be configured to flow in the opposite direction switching the inlet and outlet. FIG. 4 is a cut-away perspective view of the flow-through gas-phase electrical discharge plasma reactor configuration 100 of FIG. 3, along axis A-A.

The reactor system 10 or 100 is versatile, and can for example be combined, for example, with filtration and UV light inactivation, among a variety of other mechanisms for inactivation or chemical degradation. The systems described herein are effective at a wide variety of temperatures (including very low temperatures) and pressures, and can be scaled-up to industrial levels. The systems are effective for a wide range of electrical conductivities, and yet the energy consumption of the process is at least two orders of magnitude lower than that of the existing processes for inactivation or chemical degradation. The reactor can, for example, be made of glass or any other material, and the systems described herein are effective with or without chemical and/or biological additives.

Figure 7A:
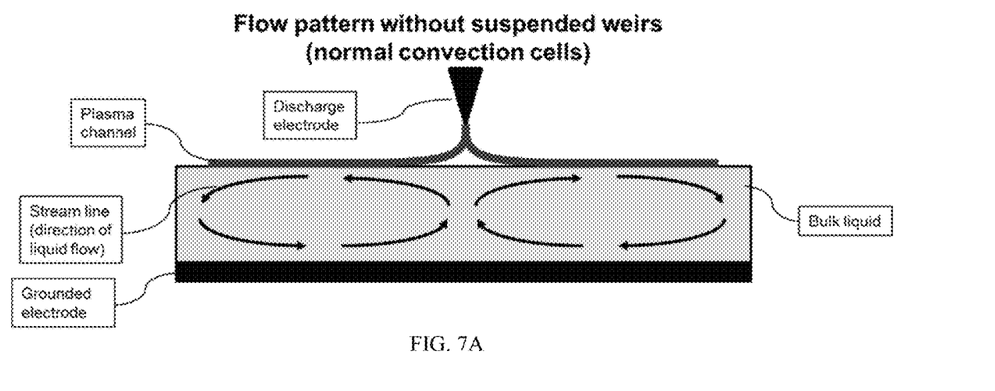
FIG. 7A is a schematic representation of a system for treatment of a gas or liquid.
Figure 7B:
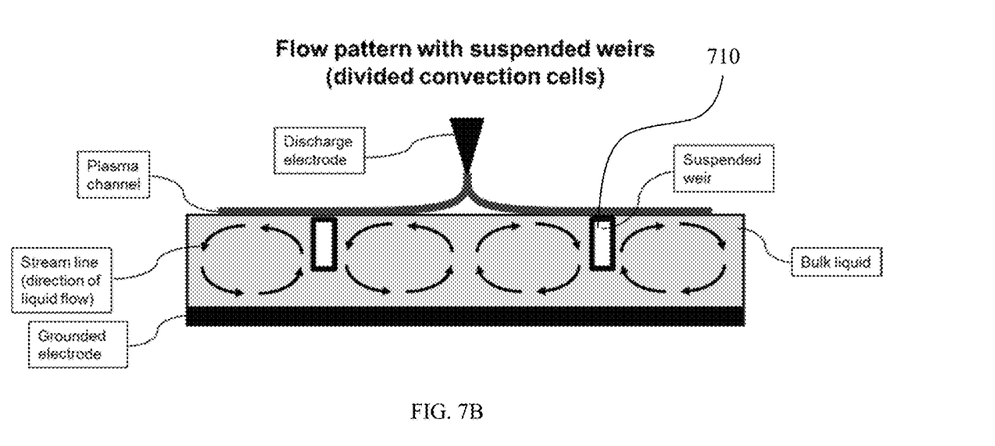
FIG. 7B is a schematic representation of a system for treatment of a gas or liquid in accordance with an embodiment.

According to an embodiment, the system can utilize periodic suspended weirs at the surface to divide each convection cell into multiple convection cells to reduce the effective residence time of fluid elements at the surface by increasing the rate at which surface fluid elements are replaced by bulk fluid elements. Referring to FIG. 7B, for example, is a system with one or more weirs 710 which alter a circulation pattern of the liquid within the reactor chamber. This is clearly demonstrated by comparing the convention cells, or circulation pattern, in FIG. 7A to the smaller and more effective pattern in FIG. 7B. The weirs can be made of any material, or be any shape, sufficient to alter a circulation pattern of the liquid within the reactor chamber. For example, the weirs can be plastic or metal, among many other materials.

Figure 5A:
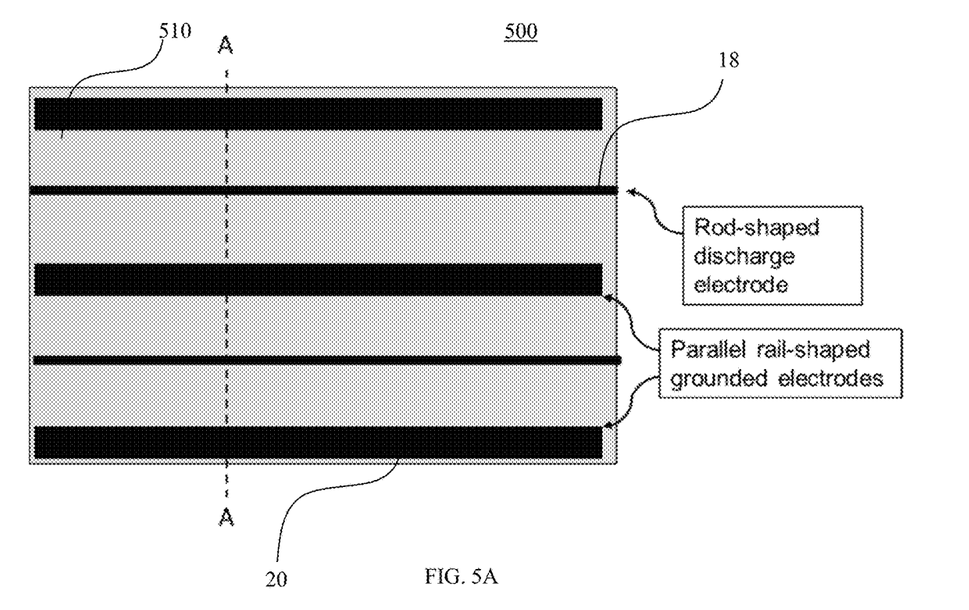
FIG. 5A is a schematic representation of a system for treatment of a gas or liquid in accordance with an embodiment.
Figure 5B:
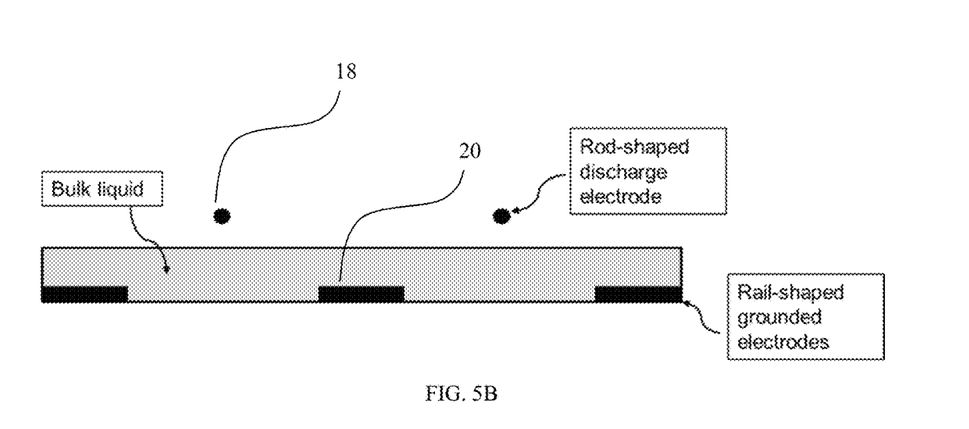
FIG. 5B is a schematic representation of the system depicted in FIG. 5A, in accordance with an embodiment.

Referring to FIGS. 5A and 5B, in one embodiment, is an electrical discharge plasma reactor configuration 500. FIG. 5B is the cutaway view at axis A-A of FIG. 5A. The system comprises one or more rod-shaped discharge electrodes 18 and one or more parallel rail-shaped grounded electrodes 20, although other configurations are possible. Voltage at the one or more rod-shaped discharge electrodes 18 creates plasma zones 510, which are rectangular in these figures. Alternatively, the system and plasma zones can be circular zones, square zones, rectangular zones, or zones of any other geometric shape.

Figure 6A:
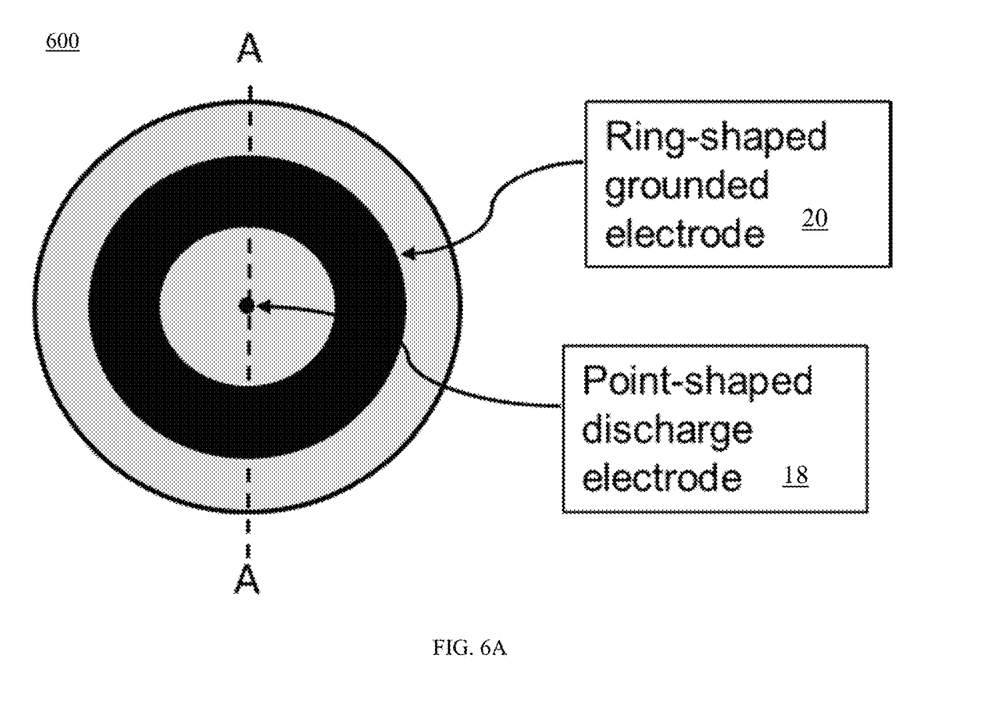
FIG. 6A is a schematic representation of a system for treatment of a gas or liquid in accordance with an embodiment.
Figure 6B:
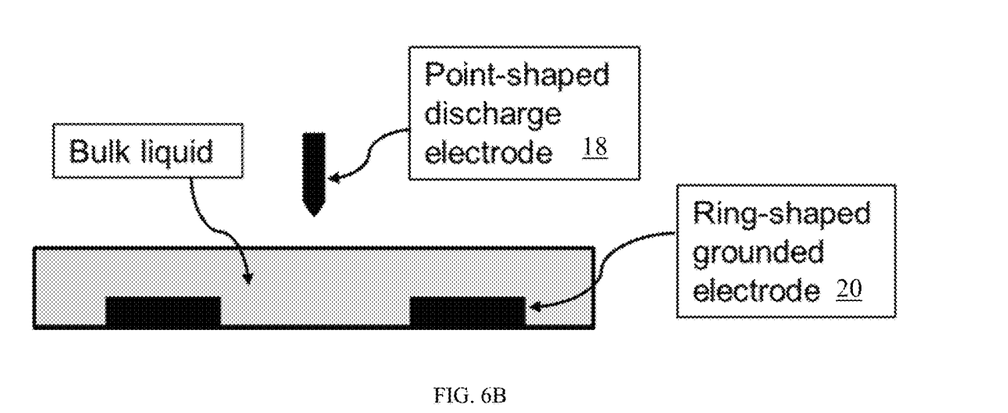
FIG. 6B a schematic representation of the system depicted in FIG. 6A, in accordance with an embodiment.

Referring to FIGS. 6A and 6B, in one embodiment, is a portion of an electrical discharge plasma reactor configuration 600. FIG. 6B is the cutaway view at axis A-A of FIG. 6A. The system comprises a ring-shaped grounded electrode 20 and a point-shaped discharge electrode 18. The system can then comprise, for example, a gas diffuser inside the circle of the ring, and/or a liquid jet around or inside the discharge electrode, among other configurations.

According to an embodiment is a method for treatment of a gas, liquid, and/or suspension in which electrical discharges at the discharge electrode result in the formation of a plasma in accordance with an embodiment of the invention. In a first step of the method, an electrical discharge plasma reactor 10 for treatment of a liquid and/or gas is provided. System or reactor 10 may be any of the embodiments described herein or otherwise envisioned, and can include, for example, any of the reactors and/or systems described in conjunction with the figures. For example, system or reactor 10 can include a chamber 14 with liquid 16, a first electrode 18, and a second electrode 20. One or both of first electrode 18 and/or second electrode 20 can be a plate, tube, wire, mesh and/or foam, among many other configurations. According to an embodiment, one or more of the electrodes can be composed of metal and/or reticulated vitreous carbon among many other components.

In the next step of the method, voltage is delivered to the discharge electrode such as electrode 18 or electrode 20. During operation, a power supply can supply voltages ranging from approximately 100 to 100,000 V DC, pulsed DC, or AC of any frequency, for example, although other voltages are possible. Plasma is generated for a sufficient amount of time to allow for the degradation of surfactants and other components or compounds in the gas, liquid, and/or suspension. This amount of time is shorter than normal due to the higher efficiency of the system, and can vary depending upon the gas or liquid, feedback information, sensor information, temperature and pressure, and a variety of other factors.

According to an embodiment, foam can be generated on the liquid surface to increase surface density in the plasma region, increase mass transfer of surface-active species, and/or increase the rate at which bulk liquid is drawn to the surface. According to an embodiment, foam may be generated by directing a turbulent or laminar liquid jet towards the surface to agitate and churn the liquid or by bubbling gas through a diffuser submerged beneath the liquid surface, after which the gas may be recirculated.

Figure 8:
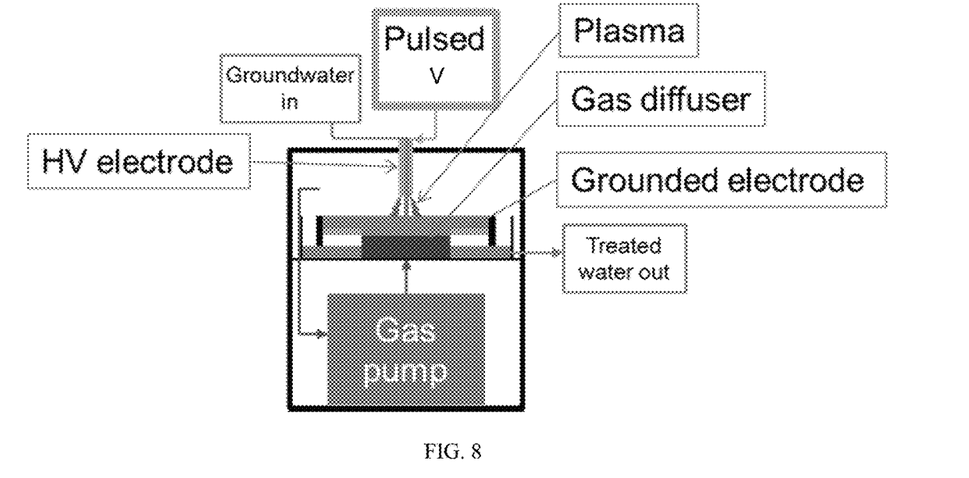
FIG. 8 is a schematic representation of a system for treatment of a gas or liquid in accordance with an embodiment.
Figure 9:
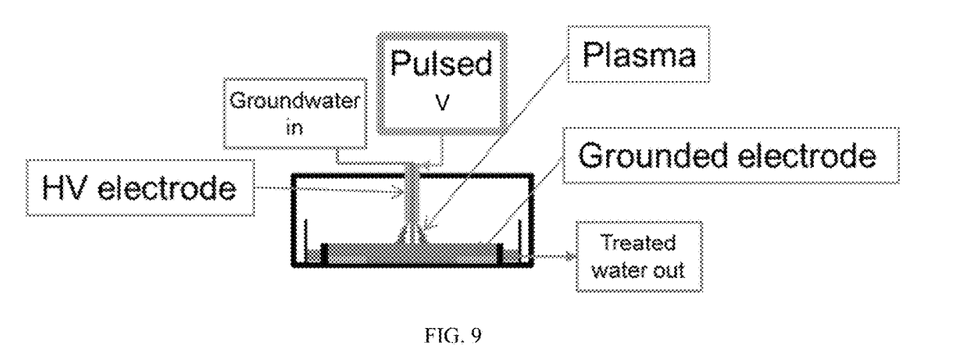
FIG. 9 is a schematic representation of a system for treatment of a gas or liquid in accordance with an embodiment.
Figure 10:
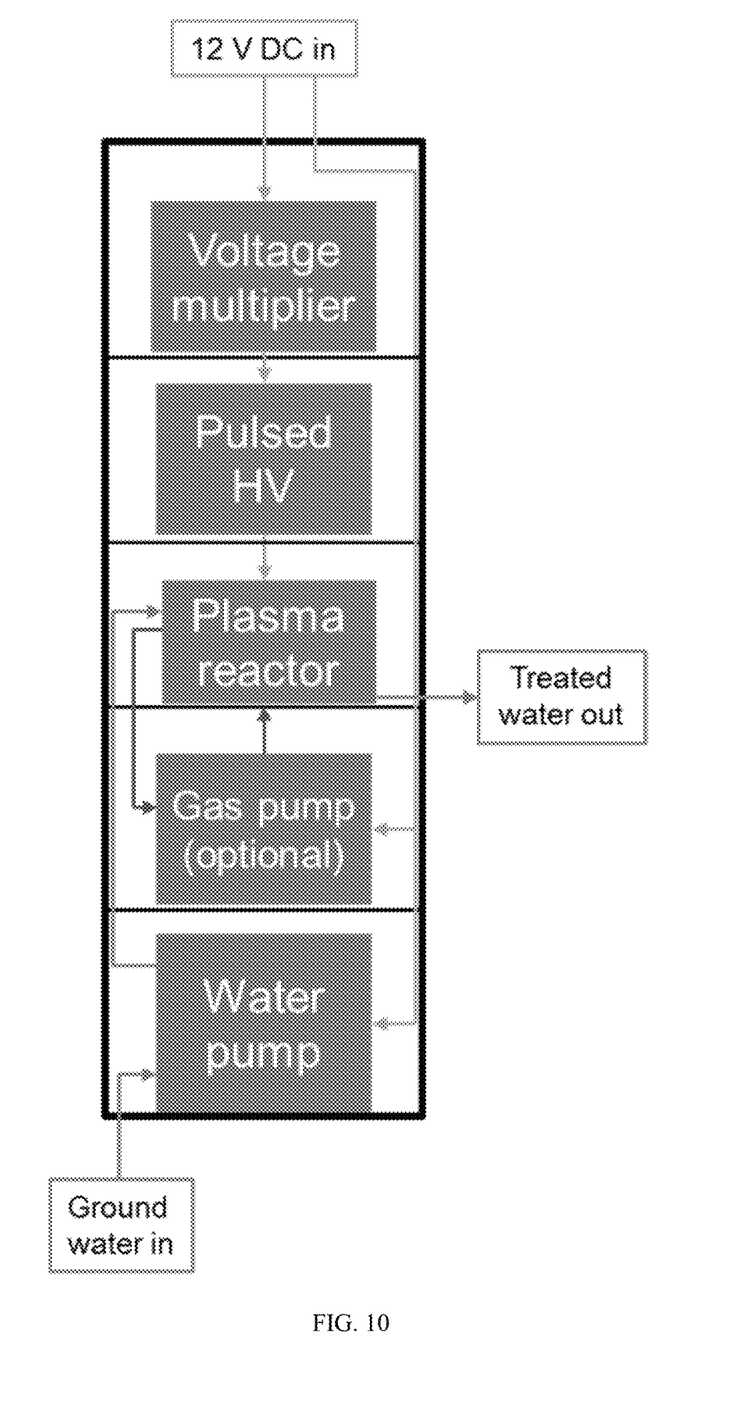
FIG. 10 is a schematic representation of a system for treatment of a gas or liquid in accordance with an embodiment.
Figure 11:
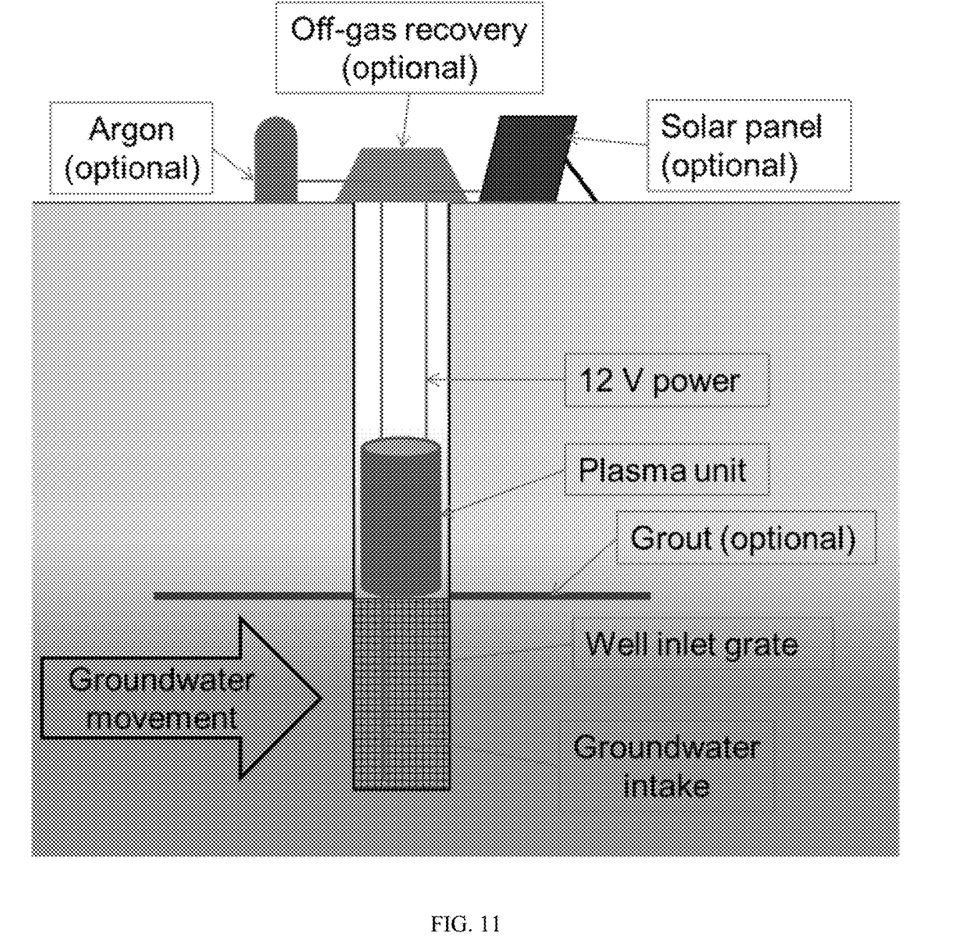
FIG. 11 is a schematic representation of a system for treatment of a gas or liquid in accordance with an embodiment.

As another example, liquid can be pumped into a plasma reactor as shown in FIGS. 8 and 9 where it is exposed to one or multiple circular plasma zones generated by point-ring electrode assemblies. To generate foam in the plasma region, a diffuser may be positioned beneath the liquid surface and within the ring electrode, as shown in FIG. 8, or the liquid may be introduced in the form of a jet above the liquid surface. According to another embodiment, the plasma reactor is housed together with the pulse generator, the liquid circulation pump, and, optionally, a gas circulation pump, as shown in FIG. 10. The entire enclosed system can, for example, reside in a well as shown in FIG. 11 to continually or periodically treat groundwater. The number of reactor stages per unit can be increased to match any desired treatment rate for a given well.

Although the present invention has been described in connection with a preferred embodiment, it should be understood that modifications, alterations, and additions can be made to the invention without departing from the scope of the invention as defined by the claims.

What is claimed is:

1. An electrical discharge plasma reactor system for treating liquid, the reactor system comprising:
   a reactor chamber configured to hold the liquid and a gas;
   a discharge electrode disposed within the reactor chamber;
   a non-discharge electrode disposed within the liquid;
   a gas diffuser disposed within the liquid, wherein the gas diffuser is configured to induce generation of a layer of foam on a surface of the liquid in a plasma-contact region; and
   a pulsed DC power supply connected to the discharge electrode, the pulsed DC power supply configured to induce the discharge electrode to generate a low-voltage plasma on the surface of the foam and/or liquid in the plasma-contact region;
   wherein the non-discharge electrode is positioned in close proximity to the gas diffuser, and is independent of the walls of the reactor chamber;
   wherein the discharge electrode is disposed within the reactor chamber such that the discharge electrode interfaces with the generated layer of foam in the plasma-contact region, but the discharge electrode does not enter the liquid.

2. The system of claim 1, wherein the non-discharge electrode is a ring.

3. The system of claim 1, wherein the non-discharge electrode comprises two or more rails disposed in the reactor chamber.

4. The system of claim 3, wherein one of the non-discharge electrode rails are positioned on either side of the gas diffuser.

5. The system of claim 1, further comprising a suspended weir configured to alter a circulation pattern of the liquid within the reactor chamber.

6. The system of claim 1, wherein the gas comprises argon.

7. The system of claim 1, further comprising a gas recycler configured to capture gas pumped through the gas diffuser into the reactor chamber, and reuse the captured gas in the same reactor chamber.

8. An electrical discharge plasma reactor system for treating a liquid, the reactor system comprising:
   a reactor chamber configured to hold the liquid and a gas;
   a discharge electrode disposed within the reactor chamber;
   a ring-shaped non-discharge electrode disposed within the liquid;
   a suspended weir configured to alter a circulation pattern of the liquid within the reactor chamber;
   a gas diffuser disposed within the liquid, wherein the gas diffuser is configured to induce generation of a layer of foam on a surface of the liquid in a plasma-contact region; and
   a pulsed DC power supply connected to the discharge electrode, the pulsed DC power supply configured to induce the discharge electrode to generate a low-voltage plasma on the surface of the foam and/or liquid in the plasma-contact region, the power supply configured to provide a voltage of 30 kV or less;
   wherein the non-discharge electrode is positioned in close proximity to the gas diffuser, and is independent of the walls of the reactor chamber;
   wherein the discharge electrode is disposed within the reactor chamber such that the discharge electrode interfaces with the generated layer of foam in the plasma-contact region, but the discharge electrode does not enter the liquid.

* * * * *